United States Patent
Wendte

(10) Patent No.: US 7,669,539 B2
(45) Date of Patent: Mar. 2, 2010

(54) METHOD AND APPARATUS FOR AN AGRICULTURAL IMPLEMENT SEED METER

(75) Inventor: Keith W. Wendte, Willowbrook, IL (US)

(73) Assignee: CNH America, LLC., New Holland, PA (US)

( * ) Notice: Subject to any disclaimer, the term of this patent is extended or adjusted under 35 U.S.C. 154(b) by 138 days.

(21) Appl. No.: 11/775,040

(22) Filed: Jul. 9, 2007

(65) Prior Publication Data

US 2009/0013909 A1 Jan. 15, 2009

(51) Int. Cl.
*A01C 7/00* (2006.01)
*A01C 9/00* (2006.01)
(52) U.S. Cl. ...................................................... 111/185
(58) Field of Classification Search ......... 111/183–185, 111/177, 200, 900; 221/211, 266, 264
See application file for complete search history.

(56) References Cited

U.S. PATENT DOCUMENTS

| | | | |
|---|---|---|---|
| 1,816,062 A | 7/1931 | Tate | |
| 3,589,558 A | 6/1971 | Belyaev et al. | |
| 4,793,511 A | 12/1988 | Ankum et al. | |
| 5,170,909 A | 12/1992 | Lundie et al. | |
| 5,392,707 A | 2/1995 | Romans | |
| 5,842,428 A | 12/1998 | Stufflebeam et al. | |
| 6,564,730 B2 * | 5/2003 | Crabb et al. | 111/185 |
| 6,742,464 B1 | 6/2004 | Chiu | |
| 6,899,042 B1 | 5/2005 | Kowalchuk | |
| 7,156,029 B2 | 1/2007 | Harnetiaux | |
| 2005/0150442 A1 * | 7/2005 | Friesen | 111/185 |
| 2005/0204972 A1 * | 9/2005 | Eben et al. | 111/185 |

FOREIGN PATENT DOCUMENTS

EP 0140699 A2 5/1985

OTHER PUBLICATIONS

Jonathan A. Brand, Contamination of Mechanical-Type Planter Seed Meters, Agricultural Engineer Honors Paper, Iowa State University, May 5, 2005.

* cited by examiner

*Primary Examiner*—Christopher J. Novosad
(74) *Attorney, Agent, or Firm*—Rebecca L. Henkel; John William Stader

(57) ABSTRACT

A seed meter includes an input port configured to receive a supply of seeds and an output port configured to deliver the supply of seeds for dispensing to a planting area and a seed disk configured to receive the supply of seeds from the input port and deliver the supply of seeds to the output port at a substantially uniform rate. The seed disk has a seed side where seeds flow from the input port, and a vacuum side opposite the seed side. The seed meter further includes a first housing portion surrounding a first portion of the seed disk in a fixed relationship to direct the supply of seeds against the seed disk and a second housing portion. The second housing portion is configured to move between a first position extending to a second portion of the seed disk to operate in concert with the first housing portion to direct the supply of seeds against the seed disk and a second position providing access to at least a portion of the second portion of the seed disk including the lowest most portion of the seed disk.

9 Claims, 4 Drawing Sheets

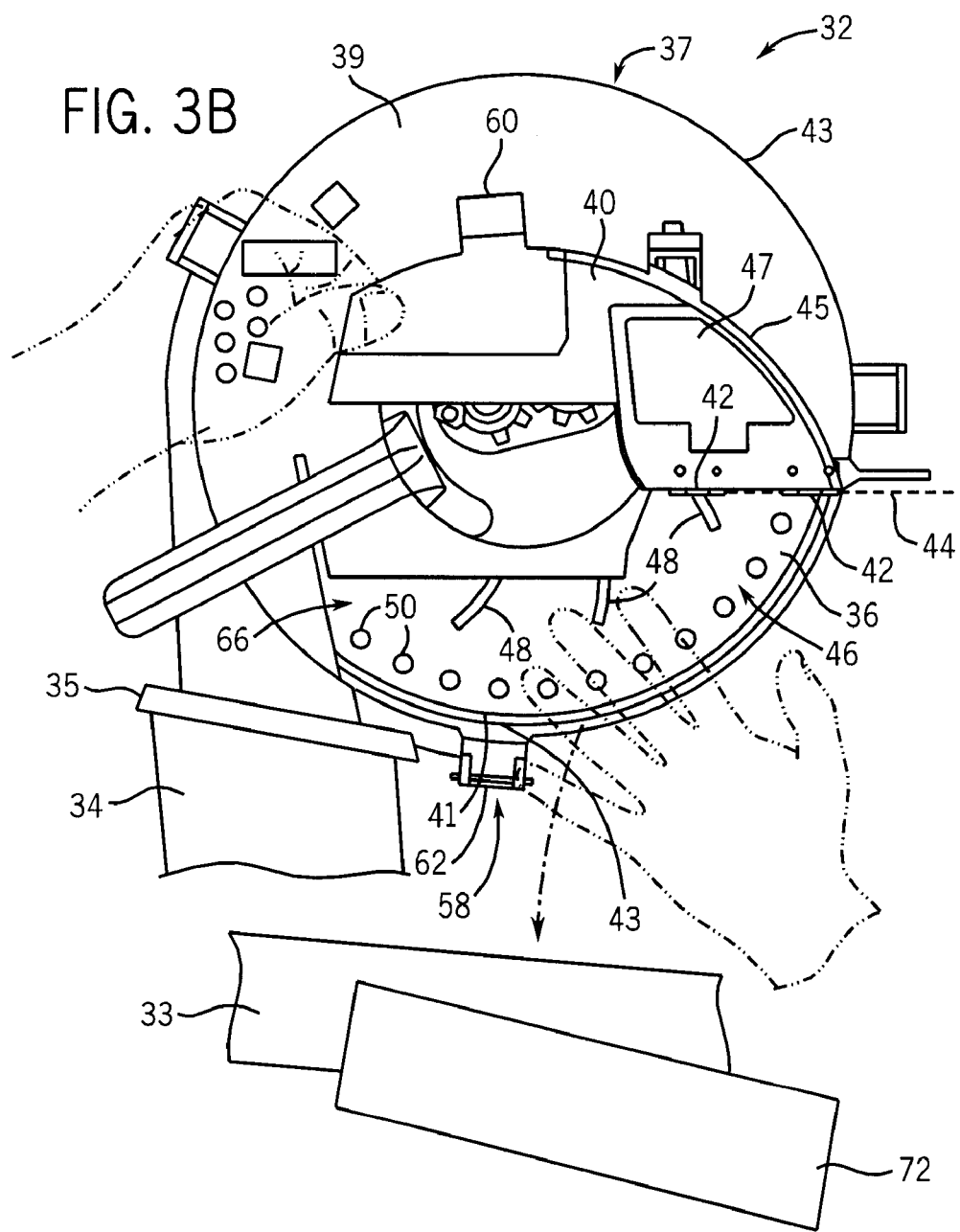
FIG. 3B
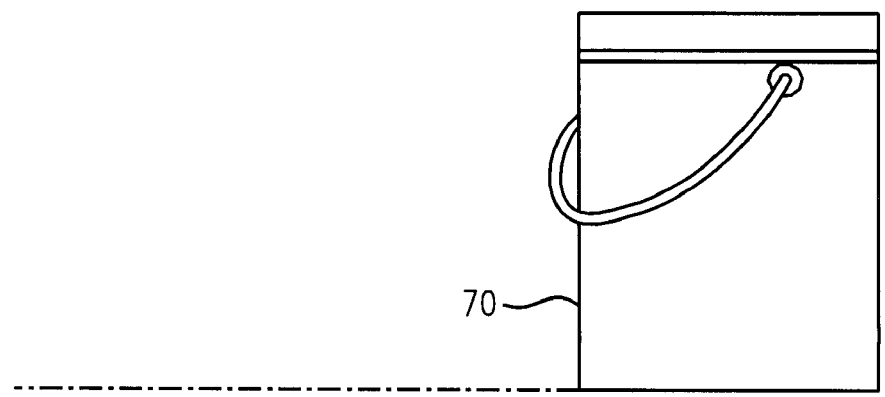

METHOD AND APPARATUS FOR AN AGRICULTURAL IMPLEMENT SEED METER

FIELD OF THE INVENTION

The present invention relates to agricultural implements, and, more particularly, to a clean-out method and apparatus for a planter seed meter.

BACKGROUND OF THE INVENTION

As the amount of genetically modified (GM) crops planted increases, it is prudent that additional care be taken to protect the various types of crops from contamination with a different crop. Greater vigilance must be taken to insure that identity-preserved grains remain segregated from planting, through harvesting and packaging in seed bags, and to the time it reaches its final market. Contamination tolerances vary from one variety to another, and some, such as corn containing the Starlink gene, can have a zero level contamination for human food consumption (Gil Gullickson, "Snowed Under By Starlink?", *Farm Industry News,* Feb. 1, 2001). In extreme cases, the negative result of such contamination can be devastating to the person or company at fault for the contamination.

One of the areas for potential contamination is in a planter. A typical planter has row units, which apply the seed, and which are supplied seed via a row hopper or a shared hopper through a plenum, for example. Each row unit typically includes a seed meter to dispense seeds at a controlled rate into a seed furrow as the seed meter is advanced above and along the seed furrow. In a typical arrangement, a tractor is coupled to tow a tool bar to which are attached in a generally parallel, spaced apart relation a plurality of planting units with a seed meter arrangement attached thereto. In addition to the seed hoppers discussed above, the planters can include a device for opening a furrow in the ground as the tractor drawn tool bar is advanced across the field over the ground, and the seed meter is coupled to the seed hopper for dispensing individual seeds into the furrow at a controlled rate, and a further device for moving soil at the sides of the furrow to close the furrow over the seeds.

With the high adoption rate of GM seeds, it is becoming necessary for farmers to clean the seed out of their planter's seed hopper and meter more often and more completely. Older design planters require the removal of the seed hopper and/or meter and often require removing additional doors or the seed disk itself in order to remove all of the seeds.

The many different types of seeds to be planted using a seed metering mechanism include corn, cotton, sorghum, sugar beets, soybeans and sunflowers, to name a few, and such seeds vary considerably in size, weight and shape. Despite these numerous differences in the size, shape and surfaces of such seeds, seed meters are expected and are required to handle all different types of seeds described above plus many more, while requiring minimum effort regarding part changes and adjustments. Different seed meter devices have been developed and include a mechanical type which typically has a vertical or horizontal seed plate or disc with mechanically actuated fingers or similarly operated mechanical devices for separating individual seeds from the seed disc and then dispense them into the furrow. While some mechanical seed meters are satisfactory for certain applications, they typically suffer from a number of limitations including the limited speed at which they can accurately dispense seeds, and inability to handle different type seeds without making cumbersome and extensive part changes, and an inherent design complexity which may typically add to the cost, wear and maintenance problems of the mechanically operated seed dispensing mechanisms.

Another type of seed meter includes a seed metering mechanism which utilizes an air pressure differential which has been developed in an effort to overcome some of the problems of the mechanical seed meters. Air pressure differential seed meters, which are commonly known as air seed meters, are generally of two types. The first type being the positive pressure type and the second type relying upon negative pressure or vacuum.

In the positive pressure type of air seed metering mechanism, air is blown into the seed chamber and onto the surface of a rotating or otherwise movable and apertured member or disc in order to create the higher than atmospheric pressure in the chamber. This forces seeds from a seed mass onto the seed member or disc where they are retained for later release. The apertures or holes in the rotating member or disc are open to atmosphere where the individual seeds are held by the blowing air until the seeds are dispensed by interrupting the flow of air to the seeds.

While air seed meters of the positive pressure type offer certain advantages over mechanical seed meters, they have certain limitations of their own which may prove to be a significant disadvantage for various seeding applications. In an effort to fill each hole or opening with a seed as the seed disc rotates through the seed mass, a relatively high pressure differential is applied to the disc. Because the seeds are held in place on the rotating disc or other movable member by differential pressure resulting from positive pressure in the chamber, it is usually necessary that the air flow be directed through the seed mass to aid in the depositing of individual seeds onto the disc. The air flow has been found to interfere with the orderly delivery of seeds from the disc and, ultimately, to the ground. In positive pressure seed metering mechanisms, the seed hopper must be sealed to maintain pressure in the system. If for any reason the hopper lid comes off or the hopper otherwise becomes unsealed, the seed meter will not properly function.

Vacuum seed meters have been found to overcome some of the problems in the positive pressure seed meters and offer more control over the seed being transported by the seed disc. In vacuum seed meters, a vacuum source is typically coupled to a separate chamber on the opposite side of the seed disc from the seed mass with the vacuum communicating through the apertures in the seed disc to the seed mass. The vacuum is of sufficient magnitude such that it tends to draw seeds into the openings defined by the disc and hold the seeds thereto as the seeds are moved through the seed disc under the influence of the moving seed disc toward the seed discharge area of the seed metering mechanism. The openings between the outer surface of the seeds and the periphery of the openings in the disc allow air to pass therethrough thereby maintaining the seeds in operable association with the disc. Because the pressure differential at the seed disc comes from a vacuum source on the opposite side thereof and not from the flow of air at the same side thereof as with positive pressure type seed metering mechanisms, the problem of having to direct an air flow through the seed mass and on to the seed disc are eliminated.

Despite the various advantages of vacuum seed meters, over seed meters of the positive pressure type or mechanical type, presently known vacuum seed meters are not without problems of their own relative to clean out. Some designs now offer easier and faster clean out of seeds for vacuum style seed meters by providing a hinged door on the vacuum side of the seed meter. These designs have the disadvantage of still having to remove the seed disk in order to allow the seed to be removed. They also do not allow all of the seeds to be removed without having to use your hand or a brush to get 100% cleanout. A collection tray is provided, but since its sized is limited the tray must be emptied several times into a larger container when the hopper is being emptied.

There are other designs which have a cleanout door on the seed side of the seed meter that unlatches and allows the remaining seed in the hopper to flow through the door into a container. However, the door does not allow all of the seed to be removed from the seed meter. In order for all of the seed to be removed, the entire hopper and meter assembly must be removed from the row unit and emptied into a container by tipping it upside down. In addition, the seed vacuum cover must be removed so that all of the seeds can be removed from the meter.

What is needed in the art is a seed meter apparatus and method which allows for a relatively quick and complete cleanout of seeds from the seed meter.

SUMMARY OF THE INVENTION

In accordance with one aspect of the invention, a seed meter is disclosed that includes an input port configured to receive a supply of seeds and an output port configured to deliver the supply of seeds for dispensing to a planting area. The seed meter also includes a seed disk configured to receive the supply of seeds from the input port and deliver the supply of seeds to the output port at a substantially uniform rate. The seed disk has a seed side where seeds flow from the input port, and a vacuum side opposite the seed side. A first housing portion is provided that surrounds a first portion of the seed disk in a fixed relationship to direct the supply of seeds against the seed disk. A second housing portion is also provided that is configured to move between a first position extending to a second portion of the seed disk to operate in concert with the first housing portion to direct the supply of seeds against the seed disk and a second position providing access to at least a portion of the second portion of the seed disk including the lowest most portion of the seed side. A locking mechanism is configured to selectively lock the second housing portion in the first position and unlock the second housing portion from the first position to move to the second portion.

The locking mechanism of the seed meter may also include a clip extending from the second housing portion that is configured to mate with a receptacle mounted to the first housing portion to lock the second housing portion in the first position.

The seed meter may also include at least one hinge connecting the second housing portion to the first housing portion to allow the second housing portion to move between the first position and the second position.

Furthermore, the first housing portion may have an approximately circular outer perimeter and the second housing portion may include an arcing contoured segment configured to substantially complete the approximately circular outer perimeter of the first housing portion when the second housing portion is in the second position.

The seed meter may also include at least one hinge connecting the second housing portion to the first housing portion.

Additionally, the first housing portion may include an approximately circular outer perimeter and the at least one hinge may connect the second housing portion to the first housing portion along a hinge axis extending along a chord of the first housing portion.

The second position of the second housing portion can provide at least tactile access to at least some of the second portion of the seed disk including the lowest most portion of the seed side.

In accordance with another aspect of the invention, an agricultural implement is disclosed that includes a planter including a seed supply element and a seed meter connected to the seed supply element. The seed meter includes an input port configured to receive a supply of seeds and an output port configured to deliver the supply of seeds for dispensing to a planting area. A seed disk is included that is configured to receive the supply of seeds from the input port and deliver the supply of seeds to the output port at a substantially uniform rate. The seed disk has a seed side where seeds flow from the input port, and a vacuum side opposite the seed side. The seed meter further includes a first housing portion surrounding a first portion of the seed disk in a fixed relationship to direct the supply of seeds against the seed disk and a second housing portion. The second housing portion is configured to move between a first position extending to a second portion of the seed disk to operate in concert with the first housing portion to direct the supply of seeds against the seed disk and a second position providing access to at least a portion of the second portion of the seed disk including a lowest most portion of the seed side.

The agricultural implement may also include a locking mechanism configured to selectively lock the second housing portion in the first position and unlock the second housing portion from the first position to move to the second portion.

Also, the first housing may extend over a first side of the seed disk, around a periphery of the seed disk, and over a portion of a second side of the seed disk.

Furthermore, the second housing portion may be configured to mate with the first housing portion in the first position to substantially cover the second side of the seed disk.

The agricultural implement may further include at least one hinge connecting the second housing portion to the first housing portion.

In addition, the first housing portion may have an approximately circular outer perimeter, the at least one hinge connects the second housing portion to the first housing portion along a hinge axis extending along a chord of the first housing portion.

The agricultural implement may also include one of a funnel and a chute connected to the agricultural implement and arranged proximate to the second housing portion to receive seeds not delivered to the output port when the second housing portion is in the second position.

A seed hopper can be connected to the input port of the seed meter to deliver the supply of seeds to the seed meter, and the second position of the second housing portion allows any remaining seeds to empty from the seed hopper.

In accordance with still another aspect of the invention, a method of manufacturing a seed meter is disclosed that includes providing a seed disk having a plurality of seed metering mechanisms to control delivery of a supply of seeds from the seed meter and arranging a first housing portion to extend the seed disk. The seed disk has a seed side where seeds flow from the input port, and a vacuum side opposite the seed side. The method also includes engaging a second housing portion with the first housing to substantially enclose the seed disk within the first housing portion and the second housing portion. Furthermore, the method includes connecting the second housing portion to the first housing portion through at least one of a hinge and a locking mechanism to adjustably secure the second housing portion in relation to the first housing portion to be movable between a first position engaging the second housing portion to, therewith, substantially surround the seed disk and a second position providing ready access past the second housing portion and through the first housing portion to at least a portion of the seed disk including a lowest most portion of the seed side.

In addition, the step of connecting may include connecting the second housing portion to the first housing portion such that the ready access is provided to at least a periphery of the seed disk.

Also, the step of connecting may include connecting the second housing portion to the first housing portion such that the ready access is provided to a least a portion of the plurality of seed metering mechanisms.

Further still, the step of connecting may include connecting the second housing portion to the first housing portion such that the ready access is provided to a majority of the seed metering mechanisms by rotating the seed disk.

The method may also include forming an input port in at least one of the first housing portion and the second housing portion and forming an output port in at least one of the first housing portion and the second housing portion and, wherein the step of connecting further includes connecting the second housing portion to the first housing portion such that the ready access is provided at least proximate to the output port.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3B is a detailed side view of the seed meter FIGS. 1-3A illustrating an associated seed chute.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
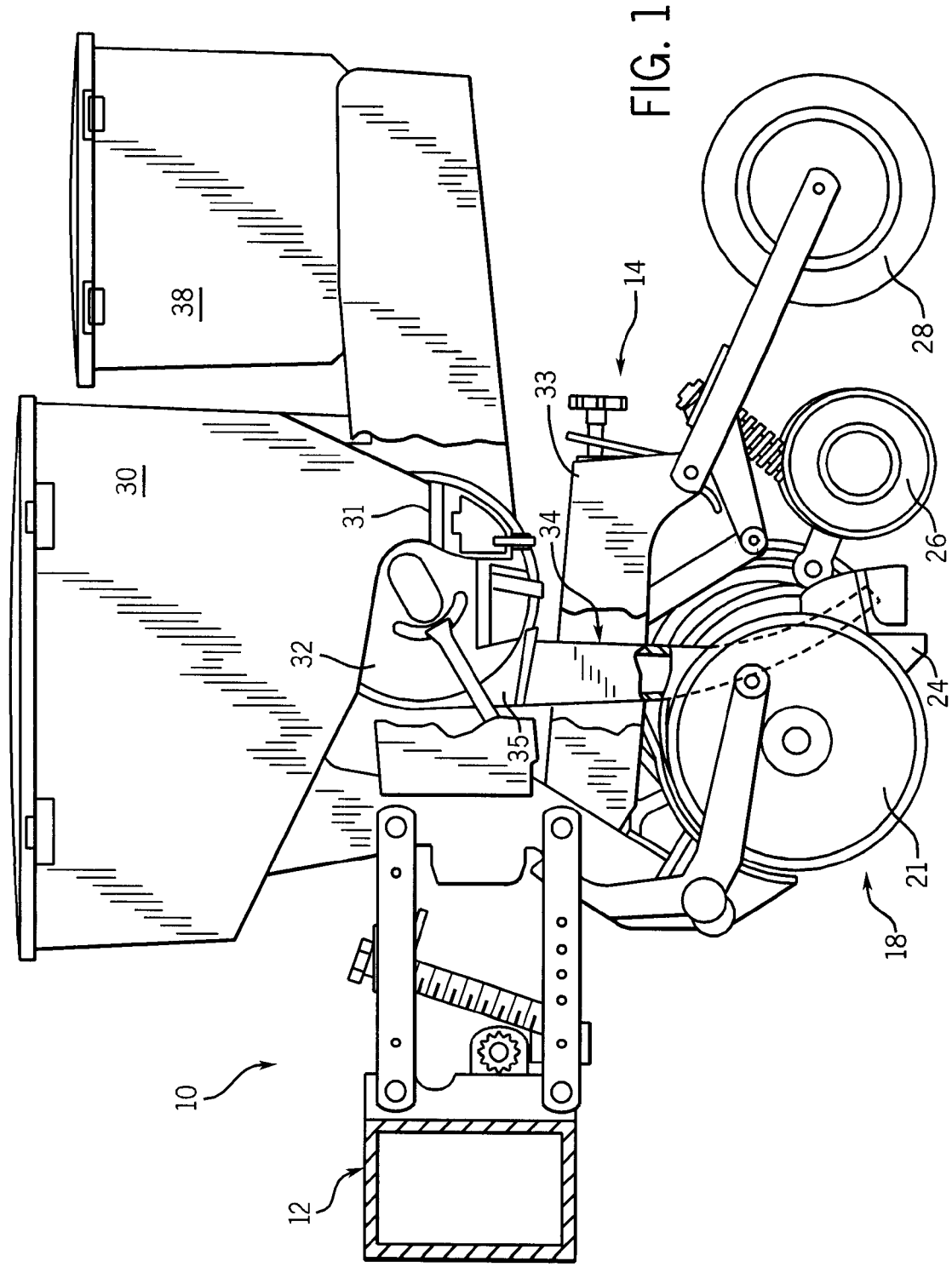
FIG. 1 is a fragmentary side view of an embodiment of an agricultural planter including a seed meter according to the present invention.

Referring now to the drawings, and more particularly to FIG. 1, an agricultural implement 10 in the form of a planter generally includes an elongated tool bar 12, which is supported for movement across and over fields by a plurality of wheels (not shown) and which is adapted to be towed in a given forward direction by a power source, such as an off-highway tractor or some other motive element (all not shown). Attached to tool bar 12 is a plurality of planting units 14 located at spaced intervals along tool bar 12; with only one being illustrated and described in detail and from which a complete understanding of the present invention may be readily determined. As is well known in the art, the planting units 14 are mounted in side-by-side relation relative to each other along the length of the tool bar 12.

In the illustrated embodiment, each planting unit 14 preferably includes a conventional furrow opening apparatus 18. The furrow opening unit 18 preferably includes a pair of lateral spaced furrow opener discs 21, a furrow forming point, and an opener shoe 24. Alternatively, and without detracting or departing from the spirit and scope of the present invention, planting unit 14 can be provided with a runner opener type for providing a furrow in the ground. Planting unit 14 further includes a pair of furrow closer discs 26 and a press wheel 28 arranged in fore-and-aft relationship relative to each other.

A seed hopper 30 is likewise carried on each planting unit 14. The purpose of seed hopper 30 is to provide storage for seed material that is to be gravitationally deposited to the ground as the planting unit moves over and across the field. It will be further appreciated that a hopper container, smaller than that exemplified in the drawings, and connected to a centralized bin or large hopper via a plenum equally suffices without detracting or departing from the spirit and scope of the present invention. In the illustrated embodiment, a seed metering mechanism or apparatus 32 is arranged to receive a supply of seed from the hopper 30 through an input port 31 arranged generally proximate hopper 30 The purpose of the seed metering apparatus or mechanism 32 is to release seeds received from seed hopper 30 at a generally uniform and/or consistent rate for deposit onto the ground. To facilitate delivery of seeds from the seed metering mechanism 32 to the ground, a vertically disposed seed tube 34 is mounted on the planting unit 14 to receive seeds as they are released from metering mechanism 32 through an output port 35. In this regard, seed tube 34 defines a vertical passage extending from the output port 35 through which seeds are delivered to the ground.

As the power source or tractor pulls the tool bar 12 across and over the ground, the furrow opening apparatus 18 operates to open a furrow in the ground. Seeds from hopper 30 flow through the input port 31, into seed metering mechanism 32, and are moved at a controlled rate through the output port 35 into seed tube 34 to uniformly move through the vertical passage defined by tube 34 onto the ground. Furrow closer 26 trails the furrow opening apparatus 18 and, as implement 10 is drawn across the field, serves to close the furrow together and over the seed dispensed by the seed metering mechanism 32 into the furrow. The trailing press wheel 28 serves to compact the soil closed over the seeds.

Optionally, a pesticide hopper 38 may be mounted toward a rear end of each planting unit 14. Hopper 38 preferably includes an insecticide or other pesticide, or fertilizer, and is provided with conventional dispensing elements for applying controlled amounts of insecticide or other pesticide where desired in connection with the planting of seeds by each planting unit 14.

Seed metering apparatus 32 can be mounted to each planting unit 14 or any area suitably mounted for movement over and across the field. Vacuum seed metering mechanism 32 is mounted to and movable with hopper 30 relative to frame structure 33 of seed planting unit 14 and relative to seed tube 34. Moreover, hopper 30 can be mounted on and removable from planting unit 14 in a conventional manner.

Figure 2:
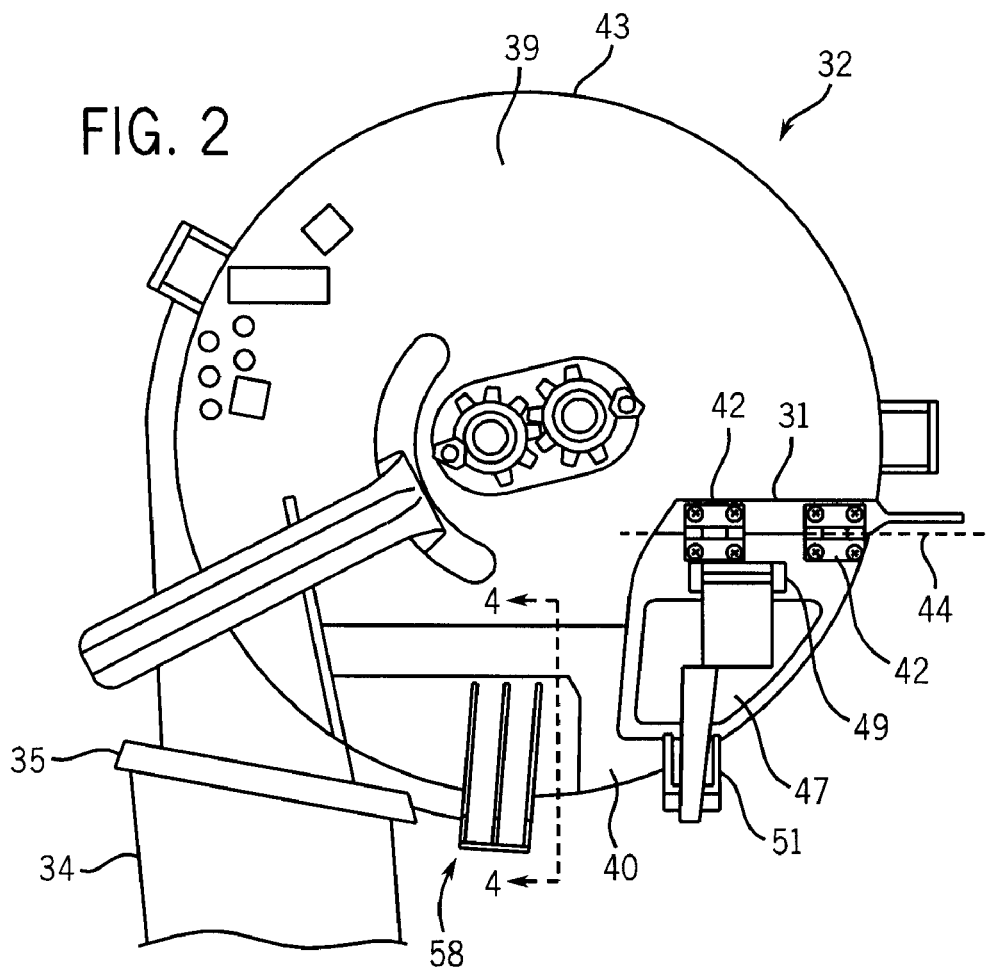
FIG. 2 is a detailed side view of the seed meter of FIG. 1 with a portion of a housing of the seed meter in a closed position.
Figure 3A:
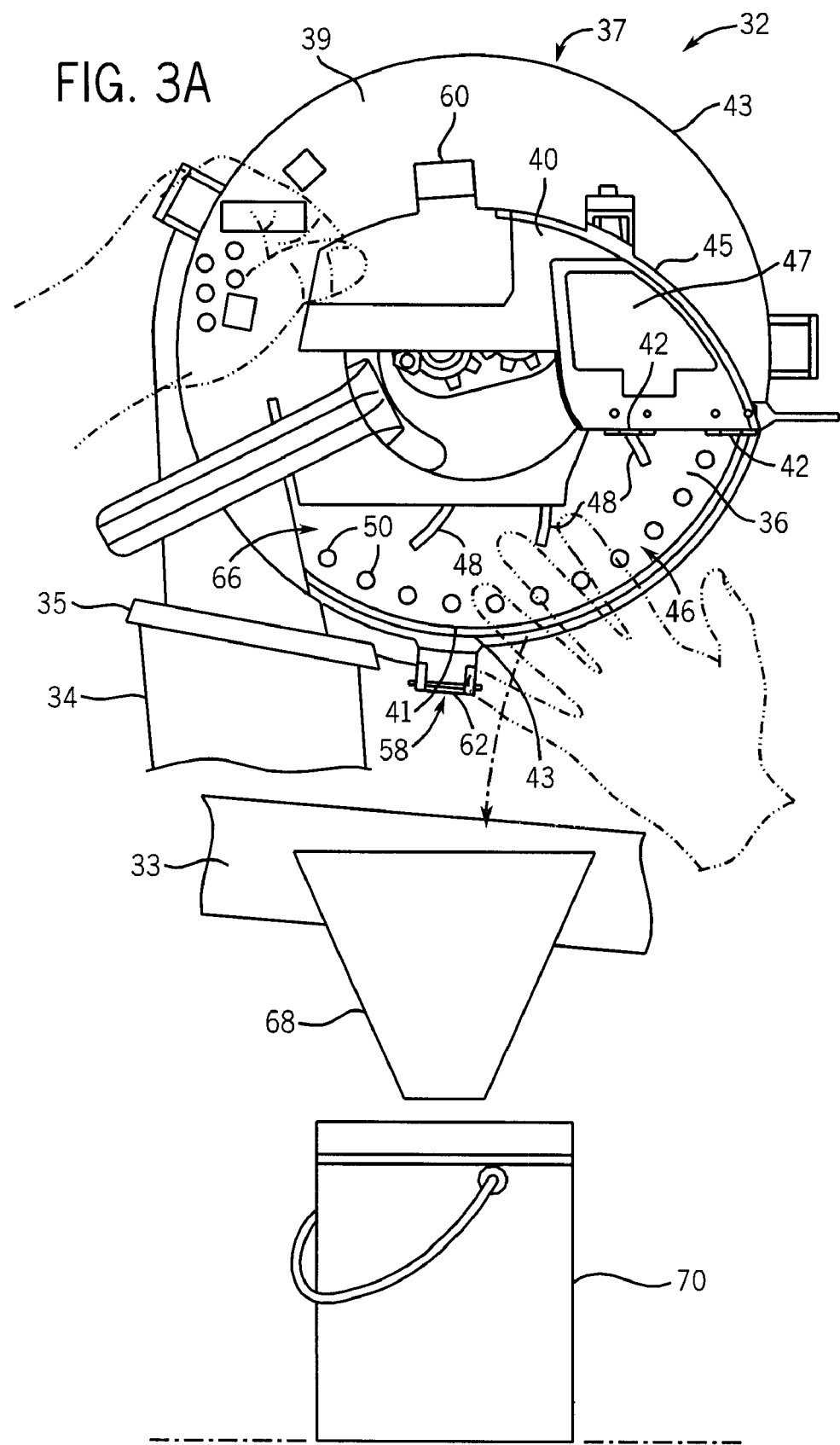
FIG. 3A is a detailed side view of the seed meter FIGS. 1 and 2 illustrating the portion of the housing of the seed meter in an open position and illustrating an associated a seed funnel.

In accordance with one embodiment, it is contemplated that seed meter 32 may be similar to that disclosed in U.S. Pat. No. 5,842,428, incorporated by reference as if fully set forth herein. In particular, referring now to FIGS. 3A-4, seed meter 32 includes a seed disk 36 arranged within a housing assembly 37. In one embodiment, housing assembly 37 of seed meter 32 has a generally cylindrical-like configuration measuring about 300 mm in diameter. As will be described in detail below, housing assembly 37 includes a first, fixed, housing portion 39 surrounding one portion of seed disk 36 and a second, movable, housing portion 40 configured to cover another portion of seed disk 36. As illustrated in FIGS. 1 and 2, first housing portion 39 and second housing portion 40 are designed to work in concert to substantially surround seed disk 36. However, as will be described in detail below, second housing portion 40, as illustrated in FIGS. 3A and 3B, is designed to move relative to first housing portion 39 to provide access past second housing portion 40 and through first housing portion 39 to the seed disk 36.

In particular, first housing portion 39 and second housing portion 40 are connected through at least one hinge 42. In this regard, a rotational axis 44 is formed about which second housing portion 40 can rotate relative to first housing portion 39 to move between a first, closed position illustrated in FIGS. 1 and 2, and a second, open position illustrated in FIGS. 3A and 3B. Therefore, second housing portion 40 provides tactile access to the lowest most portion 41 of seed side 54 of seed disk 36. In contrast, door 47, which is connected to an upper area of second housing portion 40 near seed input port 31 with hinge 49 and clasp 51, does not provide tactile access to the lowest most portion 41 of seed side 54 of seed disk 36.

As will be described, when in the closed position, first housing portion 39 and second housing portion 40 work in concert to direct seeds received by seed meter against seed disk 36. Specifically, housing assembly 37 can have an approximately circular outer perimeter 43 and, accordingly, second housing portion 40 includes an approximately circular segment contour 45 forming an arc configured to complete circular outer perimeter 43 when in the closed position. In accordance with one embodiment, axis 44 extends along a chord of circular outer perimeter 43 of housing assembly 37. On the other hand, when in the open position, as shown in FIGS. 3A and 3B, access to an interior of the housing assembly 37 is provided to allow an operator at least tactile and, preferably, visual and tactile access to at least a portion of seed disk 36.

Seed disk 36 includes a plurality of metering mechanisms, generally designated 46. In particular, in the illustrated embodiment, metering mechanisms 46 include a plurality of fins 48 that extend radially along at least one surface of the seed disk 36. Additionally, seed metering mechanisms 46 may include through holes 50 in seed disk 36. As described in U.S. Pat. No. 5,842,428, these metering mechanisms 46 operate to control a supply of seeds from hopper 30 to be dispensed through output port 35 of seed metering mechanism 32 in a generally uniform and/or constant rate. As will be described, when second housing portion 40 is moved into the open position illustrated in FIGS. 3A and 3B, access is provided to at least a portion of meter mechanisms 36 to facilitate cleaning thereof.

Figure 4:
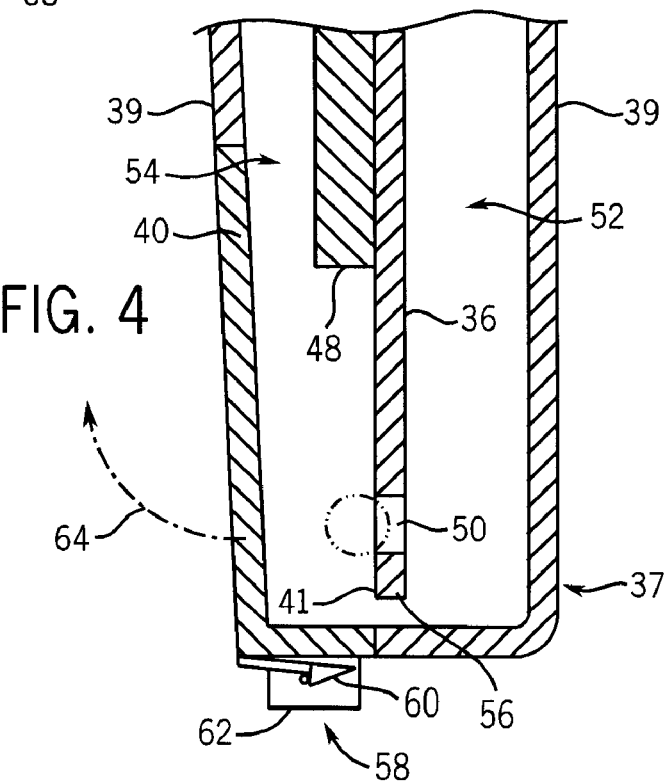
FIG. 4 is a partial, sectional view taken along section line 4-4 in FIG. 2.

In the embodiment shown in FIGS. 2-3B, first housing portion 39 and second housing portion 40 work in concert to form housing assembly 37 that directs the supply of seeds against seed disk 36. To this end, includes housing assembly 37 defines a perimeter about both a vacuum side 52 and an opposite seed side 54 of seed disk 36; however, the present invention is not limited to vacuum type seed meters, and can also be used with mechanical type seed meters and positive pressure type of air seed metering mechanism. Additionally, housing assembly 37 defines a perimeter extending about an outer periphery 56 of seed disk 36. In the illustrated embodiment, as best illustrated in FIG. 4, first housing portion 39 forms the perimeter extending along vacuum side 52 of seed disk 36, the perimeter extending about outer periphery 56 of seed disk 36, and a portion of the perimeter extending along seed side 54. To this end, second housing portion 40, when in the closed position, completes the perimeter extending along seed side 54.

To secure second housing portion 40 in the closed position, a locking mechanism 58 is included. In the illustrated embodiment, locking mechanism 58 includes a clip 60 extending from second housing portion 40 and receptacle 62 secured to first housing portion 39 in position to receive and hold clip 60. Accordingly, locking mechanism 58 serves to secure second housing portion 40 in the closed position until manual intervention releases locking mechanism 58 and second housing portion 40 is permitted to rotate along an arc 64 extending away from periphery 56 of seed disk 36 to, as described above, provide access to seed disk 36.

During operation of the illustrated configuration, the seed enters seed meter 32 through input port 31. Seed disk 36 rotates to drive the seed at a controlled rate through outlet 35. During this process, seed accumulates on seed side 54 of seed disk 36, and some of this seed will remain after the operation of seed meter 32 is terminated. If the accumulated (old) seed is not removed, and a different (new) seed is placed in hopper 30, then the new seed will be contaminated by the old seed. As illustrated, second housing portion 40 covers a lower portion 66 of seed disk 36 along seed side 54. According, manually rotating second housing portion 40 about axis 44 using hinges 42 provides ready access to the portion 66 of seed disk 36, including metering mechanisms 41 and the lower most portion of seed disk 36. An operator can use his or her hands or other tools to clean any seeds and/or debris from the interior of seed meter 32 and, in particular, seed disk 36, if necessary as in the case where the seeds have a sticky coating or otherwise adhere to the seed meter housing or seed disk. However, the L-shaped lip at the lower extent of housing portion 40, can be designed as shown in FIG. 4 such that when it swings away and seed on seed side 54 gravitationally empties into the funnel or chute. Additionally, any remaining seeds in seed hopper 30 also fall into input port 31 and subsequently empty from seed meter 32. Furthermore, by manually rotating seed disk 35 one can access the majority of seed side 54 of seed disk 36 to perform a substantially total cleanout of seed meter 32 and seed hopper 30.

Additionally, it is contemplated that a funnel 68 connected to agricultural implement 10 and positioned in proximity to second housing portion 40 when in the closed position. To this end, funnel 68 can be attached to frame 33 or other parts of implement 10 and/or attached to seed meter 32 at a variety of locations using fasteners such as nuts and bolts, screws, rivets, etc.; hooks, clips, flanges on the funnel, weldments and other fastening elements and/or combinations thereof, and can be made of sheet metal, plastic, or other materials. Alternatively, funnel 68 can be freestanding. When second housing portion 40 is in the open position, as illustrated in FIG. 3A, any accumulated remaining seeds or seed residue flows and/or can be otherwise removed from housing assembly 37, seed disk 36 and hopper 30 by allowing them to flow, or brushing them, into funnel 68, which directs the cleaned out seeds into a collection container 70.

Alternatively, referring to FIG. 3B, funnel 68 can be replaced with a chute 72. As with funnel 68, chute 72 can be attached to frame 33 or other parts of implement 10 and/or attached to seed meter 32 at a variety of locations using fasteners such as nuts and bolts, screws, rivets, etc.; hooks, clips, flanges on the chute, weldments and other fastening elements and/or combinations thereof, and can be made of sheet metal, plastic, or other materials. Alternatively, chute 72 can be freestanding.

It is contemplated that second housing portion 40 can be located in any of a variety of locations. For example, a second housing portion similar to second housing portion 40 can be hinged at one end such that it swings downwardly with a clasp at the other end for closing during operation. Additionally, the present invention can include a second housing portion located at a lower extent of the housing and which extends on either side of the housing and which also swings downwardly. In yet another configuration, it is contemplated that a lower lip is formed that protrudes from the housing assembly 32 at an approximately 45°, or other, downward angle towards a hinged housing part, which could be straight instead of L-shaped, thus allowing the remaining seeds to flow freely from the seed meter 32.

While example embodiments and applications of the present invention have been illustrated and described, including a preferred embodiment, the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

I claim:

1. A seed meter, comprising:
    an input port configured to receive a supply of seeds and an output port configured to deliver the supply of seeds for dispensing to a planting area;
    a seed disk configured to receive the supply of seeds from the input port and deliver the supply of seeds to the output port at a substantially uniform rate, the seed disk having a seed side where seeds flow from the input port, and a vacuum side opposite the seed side;
    a first housing portion surrounding a first portion of the seed disk in a fixed relationship to direct the supply of seeds against the seed disk, the first housing portion partially defining a housing for receiving the seed disk therein; and
    a second housing portion pivotably connected to the first housing portion and configured to move between a first position wherein the second housing portion extends about the seed disk and further defines a portion of the housing so as to operate in concert with the first housing portion to direct the supply of seeds against the seed side of seed disk and a second position providing access to at least a portion of the second portion of the seed disk including the lowest most portion of the seed side through the housing.

2. The seed meter of claim 1, further including a locking mechanism configured to selectively lock the second housing portion in the first position and unlock the second housing portion from the first position to move to the second portion.

3. The seed meter of claim 2, wherein the locking mechanism includes a clip extending from the second housing portion and configured to mate with a receptacle mounted to the first housing portion to lock the second housing portion in the first position.

4. The seed meter of claim 3, further comprising at least one hinge connecting the second housing portion to the first housing portion to allow the second housing portion to move between the first position and the second position.

5. The seed meter of claim 1, wherein the first housing portion has an approximately circular outer perimeter and the second housing portion includes an arcing contoured segment configured to substantially complete the approximately circular outer perimeter of the first housing portion when the second housing portion is in the second position.

6. The seed meter of claim 1, further including at least one hinge connecting the second housing portion to the first housing portion.

7. The seed meter of claim 6, wherein the first housing portion has an approximately circular outer perimeter and the at least one hinge connects the second housing portion to the first housing portion along a hinge axis extending along a chord of the first housing portion.

8. The seed meter of claim 1, further including a door hingedly connected to an upper area of the second housing portion adjacent the input port.

9. The seed meter of claim 1, wherein the second position of the second housing portion can provide at least tactile access to at least some of the second portion of the seed disk including the lowest most portion of the seed side.

* * * * *